United States Patent
Ghosh et al.

(10) Patent No.: US 11,738,330 B2
(45) Date of Patent: *Aug. 29, 2023

(54) DOPED CARBONACEOUS MATERIALS FOR PHOTOCATALYTIC REMOVAL OF POLLUTANTS UNDER VISIBLE LIGHT, MAKING METHODS AND APPLICATIONS OF SAME

(71) Applicant: BOARD OF TRUSTEES OF THE UNIVERSITY OF ARKANSAS, Little Rock, AR (US)

(72) Inventors: Anindya Ghosh, Little Rock, AR (US); Bijay P. Chhetri, Little Rock, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,255

(22) Filed: Aug. 12, 2021

(65) Prior Publication Data
US 2021/0370272 A1 Dec. 2, 2021

Related U.S. Application Data

(63) Continuation of application No. 16/034,750, filed on Jul. 13, 2018, now Pat. No. 11,117,117.
(Continued)

(51) Int. Cl.
*B01J 21/18* (2006.01)
*B01J 35/00* (2006.01)
(Continued)

(52) U.S. Cl.
CPC ............. *B01J 21/18* (2013.01); *B01J 21/063* (2013.01); *B01J 21/066* (2013.01); *B01J 23/06* (2013.01);
(Continued)

(58) Field of Classification Search
CPC ........ B01J 21/18; B01J 35/004; B01J 37/084; B01J 31/183; B01J 31/182; B01J 31/1825;
(Continued)

(56) References Cited

U.S. PATENT DOCUMENTS

2012/0165184 A1* 6/2012 Lim ...................... B01J 21/063
502/185
2016/0211529 A1* 7/2016 Kurungot ................ H01M 4/96
(Continued)

*Primary Examiner* — Lessanework Seifu
(74) *Attorney, Agent, or Firm* — Locke Lord LLP; Tim Tingkang Xia, Esq.

(57) ABSTRACT

A method of synthesizing a doped carbonaceous material includes mixing a carbon precursor material with at least one dopant to form a homogeneous/heterogeneous mixture; and subjecting the mixture to pyrolysis in an inert atmosphere to obtain the doped carbonaceous material. A method of purifying water includes providing an amount of the doped carbonaceous material in the water as a photocatalyst; and illuminating the water containing the doped carbonaceous material with visible light such that under visible light illumination, the doped carbonaceous material generates excitons (electron-hole pairs) and has high electron affinity, which react with oxygen and water adsorbed on its surface forming reactive oxygen species (ROS), such as hydroxyl radicals and superoxide radicals, singlet oxygen, hydrogen peroxide, that, in turn, decompose pollutants and micropollutants.

13 Claims, 6 Drawing Sheets

Related U.S. Application Data

(60) Provisional application No. 62/532,084, filed on Jul. 13, 2017.

(51) Int. Cl.

| | | |
|---|---|---|
| *B01J 37/08* | (2006.01) |
| *B01J 23/06* | (2006.01) |
| *B01J 21/06* | (2006.01) |
| *B01J 23/755* | (2006.01) |
| *B01J 23/72* | (2006.01) |
| *B01J 23/75* | (2006.01) |
| *B01J 23/30* | (2006.01) |
| *B01J 23/22* | (2006.01) |
| *B01J 23/745* | (2006.01) |
| *B01J 23/46* | (2006.01) |
| *B01J 23/36* | (2006.01) |
| *B01J 23/28* | (2006.01) |
| *B01J 23/26* | (2006.01) |
| *B01J 23/14* | (2006.01) |
| *B01J 23/10* | (2006.01) |
| *B01J 27/043* | (2006.01) |
| *B01J 27/04* | (2006.01) |
| *B01J 27/047* | (2006.01) |
| *B01J 27/051* | (2006.01) |
| *B01J 31/22* | (2006.01) |
| *B01J 31/18* | (2006.01) |
| *C02F 1/32* | (2023.01) |
| *C02F 1/72* | (2023.01) |
| *C02F 1/30* | (2023.01) |
| *C02F 1/28* | (2023.01) |
| *B01J 37/04* | (2006.01) |
| *C02F 101/30* | (2006.01) |

(52) U.S. Cl.
CPC ............... *B01J 23/10* (2013.01); *B01J 23/14* (2013.01); *B01J 23/22* (2013.01); *B01J 23/26* (2013.01); *B01J 23/28* (2013.01); *B01J 23/30* (2013.01); *B01J 23/36* (2013.01); *B01J 23/462* (2013.01); *B01J 23/72* (2013.01); *B01J 23/745* (2013.01); *B01J 23/75* (2013.01); *B01J 23/755* (2013.01); *B01J 27/04* (2013.01); *B01J 27/043* (2013.01); *B01J 27/047* (2013.01); *B01J 27/051* (2013.01); *B01J 31/182* (2013.01); *B01J 31/183* (2013.01); *B01J 31/1815* (2013.01); *B01J 31/1825* (2013.01); *B01J 31/2213* (2013.01); *B01J 35/004* (2013.01); *B01J 37/04* (2013.01); *B01J 37/084* (2013.01); *C02F 1/283* (2013.01); *C02F 1/30* (2013.01); *C02F 1/32* (2013.01); *C02F 1/725* (2013.01); *B01J 2231/005* (2013.01); *B01J 2531/008* (2013.01); *C02F 2101/308* (2013.01); *C02F 2201/3222* (2013.01); *C02F 2305/023* (2013.01); *C02F 2305/10* (2013.01)

(58) Field of Classification Search
CPC .... B01J 31/2213; B01J 27/051; B01J 27/047; B01J 27/04; B01J 27/043; B01J 23/10; B01J 23/26; B01J 21/066; B01J 2531/008; B01J 2231/005; C02F 1/30; C02F 1/725; C02F 1/32; C02F 2201/3222; C02F 2101/308; C02F 2305/10
See application file for complete search history.

(56) References Cited

U.S. PATENT DOCUMENTS

2018/0126368 A1* 5/2018 Prasad ................. B01J 37/0217
2019/0119120 A1* 4/2019 El-Kaderi ............. B01D 53/04

* cited by examiner

DOPED CARBONACEOUS MATERIALS FOR PHOTOCATALYTIC REMOVAL OF POLLUTANTS UNDER VISIBLE LIGHT, MAKING METHODS AND APPLICATIONS OF SAME

CROSS-REFERENCE TO RELATED PATENT APPLICATIONS

This application is a continuation application of U.S. patent application Ser. No. 16/034,750, filed Jul. 13, 2018, now allowed, which itself claims priority to and the benefit of, pursuant to 35 U.S.C. § 119(e), U.S. Provisional Patent Application Ser. No. 62/532,084, filed Jul. 13, 2017, which is incorporated herein in its entirety by reference.

STATEMENT AS TO RIGHTS UNDER FEDERALLY-SPONSORED RESEARCH

This invention was made with government support under Contract Nos. IIA-1457888 and 1547889 awarded by the National Science Foundation. The government has certain rights in the invention.

FIELD OF THE INVENTION

The invention relates generally to the field of purifications of water, and more particularly, to doped carbonaceous materials for enhancing photocatalytic removal of pollutants under visible light, making methods and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Methods such as microwave irradiation (MW) and hydrothermal carbonization method (HTC), and certain biological treatment methods like anaerobic digestion can be used in generating doped carbonaceous, but they have their own disadvantages. They generally require a high level of microwave power (e.g., MW). In addition, the design of a HTC reactor is very complex and requires high cost. Some methods are tedious also because they require long time, and due to lack of operating at high temperature some contamination always remain in products (e.g., anaerobic digestion). Additionally, these methods are only suitable for wet materials and temperature cannot be increased to more than 250° C.

These conventional techniques of generating doped carbonaceous materials cannot eliminate contaminations, volatile substances, non-carbon substances, and do not produce high quality doped carbonaceous materials. Thus, further purification by activation, e.g., using chemicals like KOH, is generally required, which is a time consuming process and not feasible due to additional cost for more chemicals.

Various carbonaceous materials such as graphene, carbon nanotubes, carbon black, have been used as a carbon support to enhance photocatalytic activities of the photocatalyst materials. But, they have disadvantages like being non-renewable in origin, high cost, regeneration problem of the materials, and so on.

Therefore, a heretofore unaddressed need exists in the art to address the aforementioned deficiencies and inadequacies.

SUMMARY OF THE INVENTION

One of the objectives of this invention is to develop a new photocatalytic doped carbonaceous material using renewable resources which can be used as a heterogeneous catalyst in the purification of water by advanced oxidation process (AOP).

In one aspect of the invention, a method of synthesizing a doped carbonaceous material, includes mixing a carbon precursor material with at least one dopant to form a homogeneous/heterogeneous mixture; and subjecting the mixture to pyrolysis in an inert atmosphere to obtain the doped carbonaceous material.

In one embodiment, the pyrolysis is performed with a first pyrolysis carried out at a first temperature for a first period of time, and a second pyrolysis carried out at a second temperature for a second period of time. In one embodiment, the first temperature is in a range of about 180° C. to about 300° C., the second temperature is in a range of higher than about 300° C. to about 1100° C., the first period of time is less than about 1 hour, and the second period of time is about 1-2 hours. The temperature and time can be varied based on the types of the doped carbonaceous materials.

In one embodiment, the pyrolysis is performed in a tube furnace, an electrical heating instrument designed for heating samples up to 1100° C., equipped with precision programmable temperature controller with 30 programmable segments of heating rate, dwell time and cooling rate, and the inert atmosphere inside the tube furnace created by passing inert gases such as nitrogen ($N_2$) and argon (Ar).

In one embodiment, the carbon precursor material and the at least one dopant are mixed in a solid phase, or in a solution phase. In one embodiment, in solution phase, the mixture is obtained by reacting the mixture of starting compounds chemically through various chemical reaction process, followed by solvent evaporation and drying before subjecting the mixture to the pyrolysis.

In one embodiment, the carbon precursor material comprises a renewable polymer of natural and synthetic origin. In one embodiment, the renewable polymer comprises chitosan, chitin, cellulose, guar, alginic acid, hemicellulose, dextran, xanthan, agar, lignin, starch, sucrose, dextrose, silk, wool, DNA, RNA, protein, glycogen, amylose, enzymes, polypeptides, pectin, keratin, collagen, hyaluronic acid or their derivatives and renewable synthetic polymers comprise of polylactic acid, polyglycolic acid, polycaprolactone, polyaspartic acid, polyphosphazenes, polyhydroxyalkanoate, polybutyrate, poly-3-hydroxybutyrate, poly (lactide-co-glycolide), poly(hydroxybutyrate-co-hydroxyvalerate), poly (butylene succinate), poly (butylene succinate adipate), poly (ethylene succinate), or a combination of them.

In one embodiment, the at least one dopant comprises heteroatoms containing molecules, metal oxides/sulfides, metal catalysts, metal complexes, metal salts, or a combination of them. In one embodiment, the heteroatoms containing molecules comprise any N-containing precursor (e.g., urea, pyrrole, ammonia, cyanide, N-heterocyclic compounds (e.g. pyridine, pyrazine, imidazole), ethylenediamine, diethylenetriamine, triethylenetetramine, bipyridine, phenanthrolene, polypyrrole, polyaniline, polyimide, dopamine, melamine, amines (1°, 2°, 3° organic amines), amino acids, 2,2';6',2"-terpyridine, dimethylglyoximate, 1,4,7,10-tetraazacyclododecane-1,4,7,10-tetraacetic acid, diethylenetriaminepentaacetic acid, iminodiacetic acid, nitrilotriacetic acid, inorganic and organic quaternary ammonium salts, chitosan, etc.), P-containing precursor (e.g., phosphoric acid, alkyl and aryl phosphines, phytic acid etc.), S-containing precursor (thiophene, p-toluenesulfonic acid, benzyl disulfide, potassium sulfate, sodium thiosulfate, ferrous sulfate etc.), B-containing precursor (e.g., boric acid, sodium tetraphenylborate etc.), F-containing precursor (e.g., polytetrafluoroethylene, ammonium fluoride etc.), both S- and N-containing precursor (e.g., diammonium hydrogen phosphate, thiourea, cysteine, glutathione etc.), both F- and P-containing precursor (e.g., sodium hexafluoro phosphate), tri F- P- and N-containing precursor (e.g., ammonium hexafluorophosphate) and the like.

In one embodiment, the metal oxides/sulfides comprise $ZnO$, $TiO_2$, $NiO$, $Ni_2O_3$, $CuO$, $Cu_2O$, $Co_2O_3$, $W_2O_3$, $WO_3$, $V_2O_5$, $Fe_3O_4$, $FeO$, $FeO_2$, $Fe_2O_3$, $RuO_2$, $RuO_4$, $Re_2O_7$, $MoO_3$, $ZrO_2$, $Cr_2O_3$, $CrO$, $CrO_2$, $SnO_2$, $CeO_2$, $FeS_2$, $CdS$, $NiS$, $NiS_2$, $Ni_3S_2$, $Ni_3S_4$, $CoS$, $Bi_2S_3$, $ZnS$, $CuS$, $Cu_2S$, $PbS$, $MoS_2$, $WS_2$, etc. or the like.

In one embodiment, the metal catalysts comprise of metal salens, and any metal cyclic and acyclic tetraaza or triaza ligands (e.g. metal porphyrins, metal corroles, metal triazacyclononane, metal phthalocyanines and/or metal-amidomacrocyclic).

In another aspect, the invention relates to a doped carbonaceous material synthesized as above.

In one embodiment, activities of the doped carbonaceous material are tunable by varying the carbon precursor material and the at least one dopant in a mass ratio (w %) or in an atomic weight percentage (at. %).

In a further aspect of the invention, a method of purifying water includes providing an amount of the doped carbonaceous material synthesized above in the water as a photocatalyst; and illuminating the water containing the doped carbonaceous material with visible light such that under visible light illumination, the doped carbonaceous material generates excitons (electron-hole pairs) and has high electron affinity, which react with oxygen and water adsorbed on its surface forming reactive oxygen species (ROS), such as hydroxyl radicals, superoxide radicals, singlet oxygen, peroxide, that, in turn, decompose pollutants and micropollutants.

In one embodiment, the metal catalysts comprise of metal salens, and any metal cyclic and acyclic tetraaza or triaza ligands (e.g. metal porphyrins, metal corroles, metal triazacyclononane, metal phthalocyanines and/or metal-amidomacrocyclic ligand) anchored or mixed on the doped carbonaceous materials generate high-valent metal oxo species on visible light exposure in the presence of oxygen, which help in photocatalytic degradation and removal of pollutants and micorpollutants more efficiently.

In one embodiment, the doped carbonaceous material is re-usable.

In a further aspect of the invention, a system of purifying water has a reactor vessel for containing the water and the doped carbonaceous material synthesized above and dispersed in the water; and a light source for generating visible light to illuminate the water containing the doped carbonaceous material, such that under photocatalytic reactions of the doped carbonaceous material with the visible light, pollutants in the water are adsorbed on active surface sites of the doped carbonaceous material that are removable from the water.

In one embodiment, the system further has a stirrer to disperse the doped carbonaceous material in the water.

In one embodiment, the light source comprises light emitting diodes (LEDs), an incandescent lamp, mercury vapor lamp, xenon (Xe) lamp, or natural sunlight.

In one embodiment, the photocatalytic reaction is optimized to achieve maximal photocatalytic degradation of adsorbed pollutants, by an amount of the doped carbonaceous material, a pH condition, a concentration of pollutants, and a wavelength of the visible light.

In one embodiment, the doped carbonaceous material is re-usable.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1:
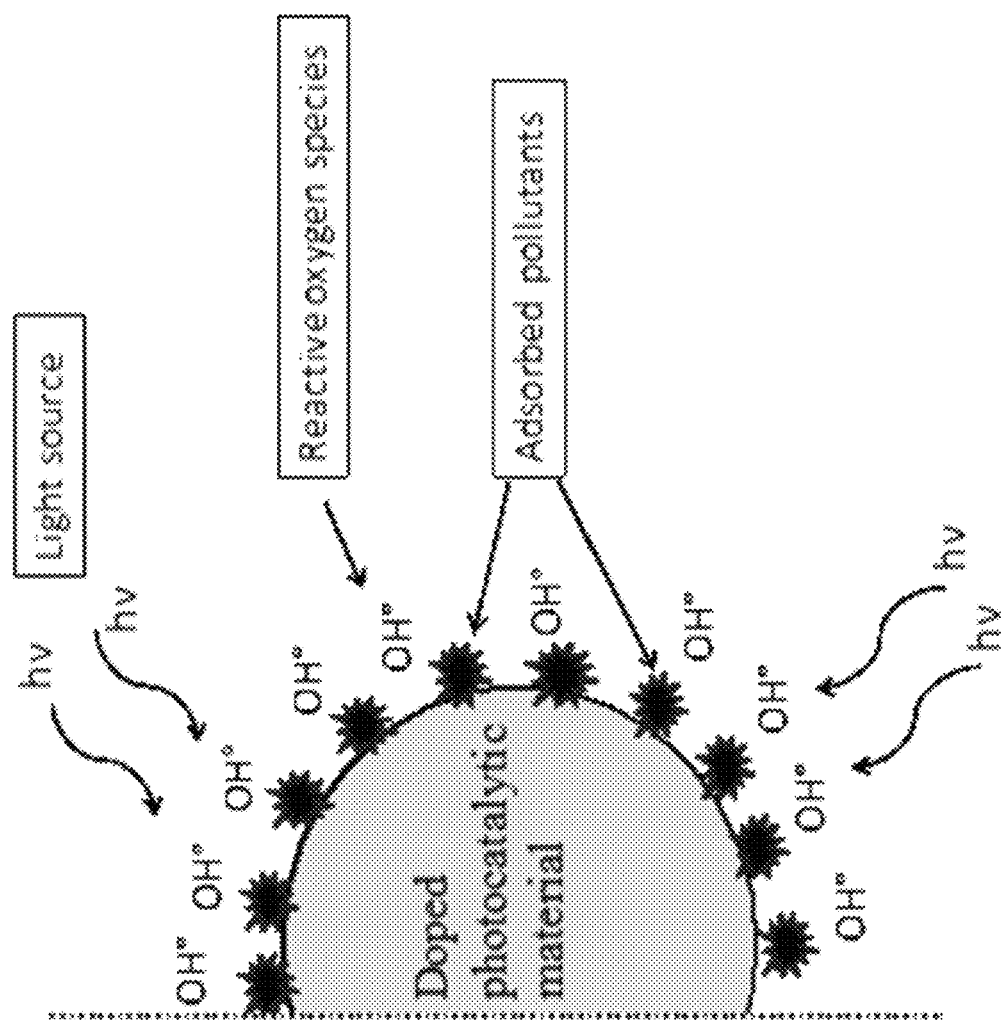
FIG. 1 illustrates schematically photocatalytic degradation of adsorbed pollutants on a photocatalytic doped carbonaceous material according to one embodiment of the present invention. The doped carbonaceous material acts as a highly active catalyst that has more active surface site where the pollutants get accumulated around for enhancing photodegradation.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the phrase "at least one of A, B, and C" should be construed to mean a logical (A or B or C), using a non-exclusive logical OR.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In certain aspects, the present invention relates to a method of synthesis of doped carbonaceous materials that have catalytic activities. In certain embodiments, the synthesis of such doped carbonaceous materials is obtained by doping and pyrolysis processes. The method includes the selection of carbon precursors and dopant compounds that are suitable for making photocatalytic doped carbonaceous materials. The precursor materials and the dopant compounds are mixed in their solid form with a varying ratio of their mass amount to form a homogeneous/heterogeneous mixture. This process of mixing the precursor compounds is referred as doping. Afterward, the mixture is subjected to pyrolysis, which is carried in an inert atmospheric condition under the continuous flow of $N_2$ or Ar gas.

In certain embodiments, doping helps bring changes in the fundamental properties of the carbonaceous material, thereby significantly improving their activities. For example, doping of a carbonaceous material with photocatalyst such as $TiO_2$ extends the light absorption capacity of $TiO_2$ into the visible region, and thus helps increase the photocatalytic activity of the $TiO_2$ catalyst. The activity of the photocatalyst can be tuned by varying the dopants and carbon either in a mass ratio (w %) or in an atomic weight percentage (at. %). The amount of a single dopant or a compound of different dopants along with the carbon precursor material can be changed in their mass or atomic ratio.

Afterward, the mixture is subjected to pyrolysis. A first pyrolysis is carried by holding the temperature at about 200° C. to about 300° C. and then a second pyrolysis is carried out in an inert atmospheric environment holding the temperature higher than >about 300° C. to about 1100° C. The pyrolysis is performed in a tube furnace equipped with a precision programmable temperature controller device and an inert atmosphere inside the furnace created by passing inert gas such as $N_2$ or Ar. The carbon precursor material selected generally is renewable polymer of natural and synthetic origin. The renewable natural polymer comprises chitosan, chitin, cellulose, guar, alginic acid, hemicellulose, dextran, xanthan, agar, lignin, starch, maltose, sucrose, dextrose, silk, wool, DNA, RNA, protein, glycogen, amylose, enzymes, polypeptides, pectin, keratin, collagen, hyaluronic acid or their derivatives or a combination of them, and the renewable synthetic polymer comprises of polylactic acid, polyglycolic acid, polycaprolactone, polyaspartic acid, polyphosphazenes polyhydroxyalkanoate, polybutyrate, poly-3-hydroxybutyrate, poly (lactide-co-glycolide), poly(hydroxybutyrate-co-hydroxyvalerate), poly(butylene succinate), poly (butylene succinate adipate), poly(ethylene succinate), or their derivatives or a combination of them. The dopants basically comprised any N-containing precursor (e.g., urea, pyrrole, ammonia, cyanide, N-heterocyclic compounds (e.g. pyridine, pyrazine, imidazole), ethylenediamine, diethylenetriamine, triethylenetetramine, bipyridine, phenanthrolene, polypyrrole, polyaniline, polyimide, dopamine, melamine, amines (1°, 2°, 3° organic amines), amino acids, 2,2';6',2"-terpyridine, dimethylglyoximate, 1,4,7,10-tetraazacyclododecane-1,4,7,10-tetraacetic acid, diethylenetriaminepentaacetic acid, iminodiacetic acid, nitrilotriacetic acid, inorganic and organic quaternary ammonium salts, chitosan, etc.), P-containing precursor (e.g., phosphoric acid, alkyl and aryl phosphines, phytic acid etc.), S-containing precursor (thiophene, p-toluenesulfonic acid, benzyl disulfide, potassium sulfate, sodium thiosulfate, ferrous sulfate etc.), B-containing precursor (e.g., boric acid, sodium tetraphenylborate etc.), F-containing precursor (e.g., polytetrafluoroethylene, ammonium fluoride etc.), both S- and N-containing precursor (e.g., diammonium hydrogen phosphate, thiourea, cysteine, glutathione etc.), both F- and P-containing precursor (e.g., sodium hexafluoro phosphate), tri F- P- and N-containing precursor (e.g., ammonium hexafluorophosphate) such that a single, dual or tri heteroatoms doping of carbonaceous materials is possible for enhanced photocatalysis. Also, the carbon source and the dopant can be made chemically react in the solution phase followed by solvent evaporation and drying before subjected to pyrolysis. Doping can be achieved in the solid state or in the solution stage. Further, doping may take place during the pyrolysis of the mixture at high temperature.

In general, "pyrolysis", refers to heating the mixture at high temperature generally above 200-300° C. in the absence of oxygen. Thus, the mixture gets decomposed with the loss of volatile compounds and possibly remaining liquids or moistures. Before heating the mixture above 200-300° C., it is subjected to heat treatment below the melting or decomposition temperature (generally less than about 200° C.), which causes dehydration or the loss of moisture.

The renewable polymers of natural and synthetic origin are used as a carbon source in developing photocatalyst. Besides being most abundant, inexpensive, readily available either in natural or in synthesized form, they are a good carbon precursor for developing doped carbonaceous materials of photocatalytic nature.

The various reactive functional groups such as hydroxyl groups (e.g., in cellulose), amine group (e.g., in chitosan) etc. present in the molecular structure of renewable polymers can offer the opportunity for modification which can be further helpful to develop photocatalyst materials with the enhanced activity.

The photocatalyst materials synthesized according to the present invention serve for the remediation of various toxic and hazardous chemical/biological pollutants and micropollutants which includes textile dyes (e.g., Congo red, Alizarin red S, Crystal violet, Methyl orange, Methyl red, Orange G, Naphthalene blue, Methylene blue, Eosin yellowish, Naphthol green B etc.), pharmaceuticals (e.g., beta-blockers drugs, antidepressants, hypolipidemic drug, analgesics, antibiotics, veterinary drugs), personal care products (PCPs) (e.g., fragrances, cosmetics, soap, detergent, toothpaste etc.), pulp-paper effluent, biological pathogen (e.g., viruses, bacteria, fungus etc.), hydrocarbons and polyaromatic hydrocarbons, organic solvents, volatile organic carbon, toxic gases, hormones, sanitary products, endocrine disrupting compounds (EDCs) (e.g., diethylstilbestrol (the synthetic estrogen DES), phytoestrogens (genistein and diadzein), Di(2-ethylhexyl)phosphate (DEHP), DDT and other pesticides, insecticides, herbicides, bisphenol A (BPA), polychlorinated biphenyls (PCB), dioxins and dioxins-like compounds etc.), phenols and p-nitrophenols from polluted water.

For this purpose, one aspect of the invention is directed to designing a photo reactor including visible light illuminating lamp and a reactor vessel comprised of doped carbonaceous material. In certain embodiments, natural sunlight, which is an interminable light source, can be also used as a source of visible light.

As shown in FIG. 1, photocatalytic degradation of adsorbed pollutants on a photocatalytic doped carbonaceous material is shown according to one embodiment of the present invention. The doped carbonaceous material acts as a highly active catalyst that has more active surface site where the pollutants get accumulated around for enhancing photodegradation.

Figure 2:
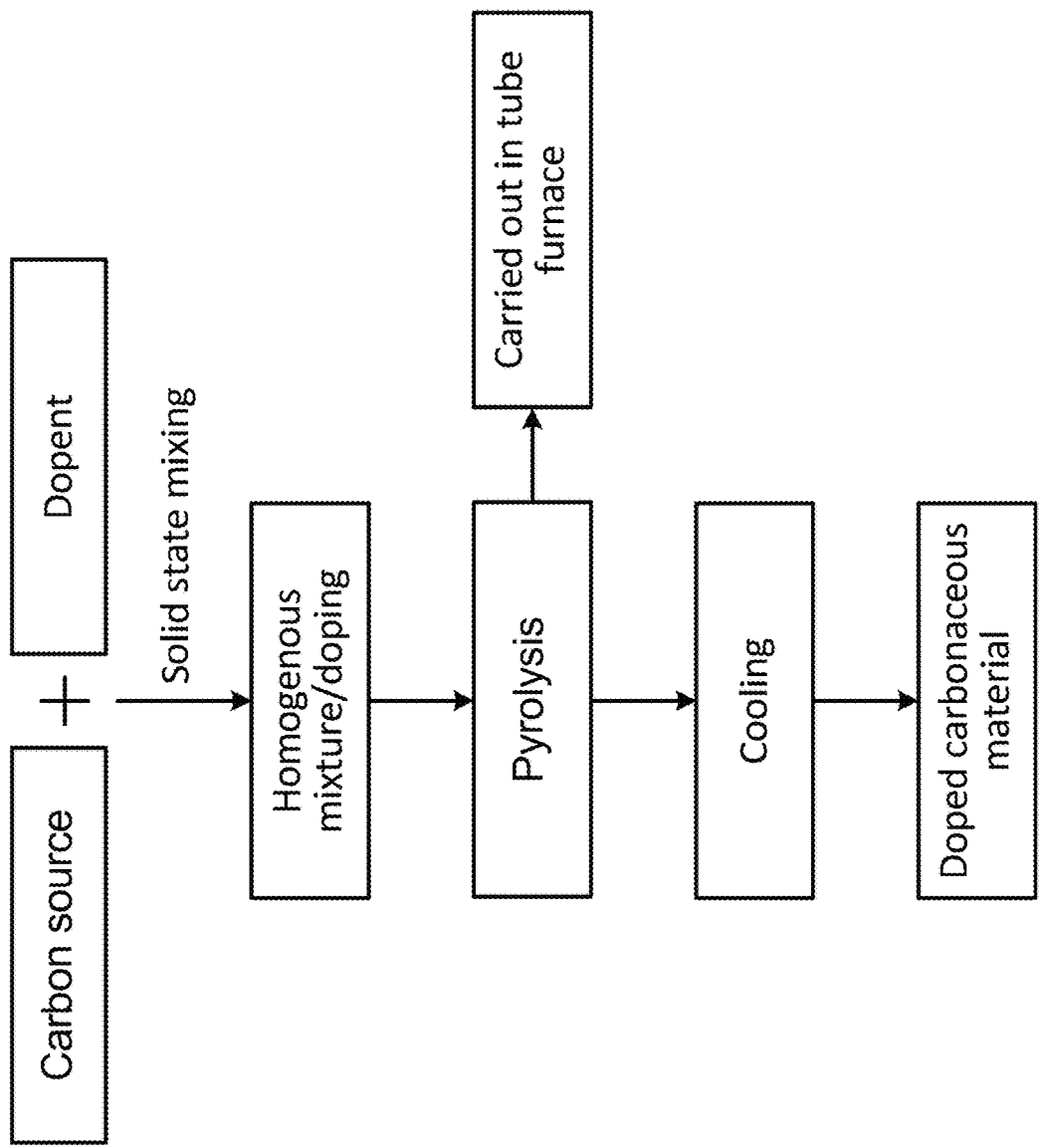
FIG. 2 shows schematically a flowchart of a method to synthesize an N-doped carbonaceous using renewable natural polymer (e.g., cellulose), as a carbon source and a heteroatom compound (e.g., urea) as a nitrogen source for doping, according to one embodiment of the present invention.

Referring to FIG. 2, a flowchart of a method to synthesize a doped carbonaceous material is shown according to one embodiment of the present invention. In one embodiment, renewable polymer, e.g., cellulose, is used as a carbon source, and heteroatom compound, e.g., urea, is used as a nitrogen source for doping. First, the carbon source and the dopant are mixed in their solid states to form a homogeneous/heterogeneous mixture, which is referred to doping. Second, the mixture is subjected to pyrolysis, which is carried out in a tube furnace. After cooling, the N-doped carbonaceous material is obtained.

Figure 3:
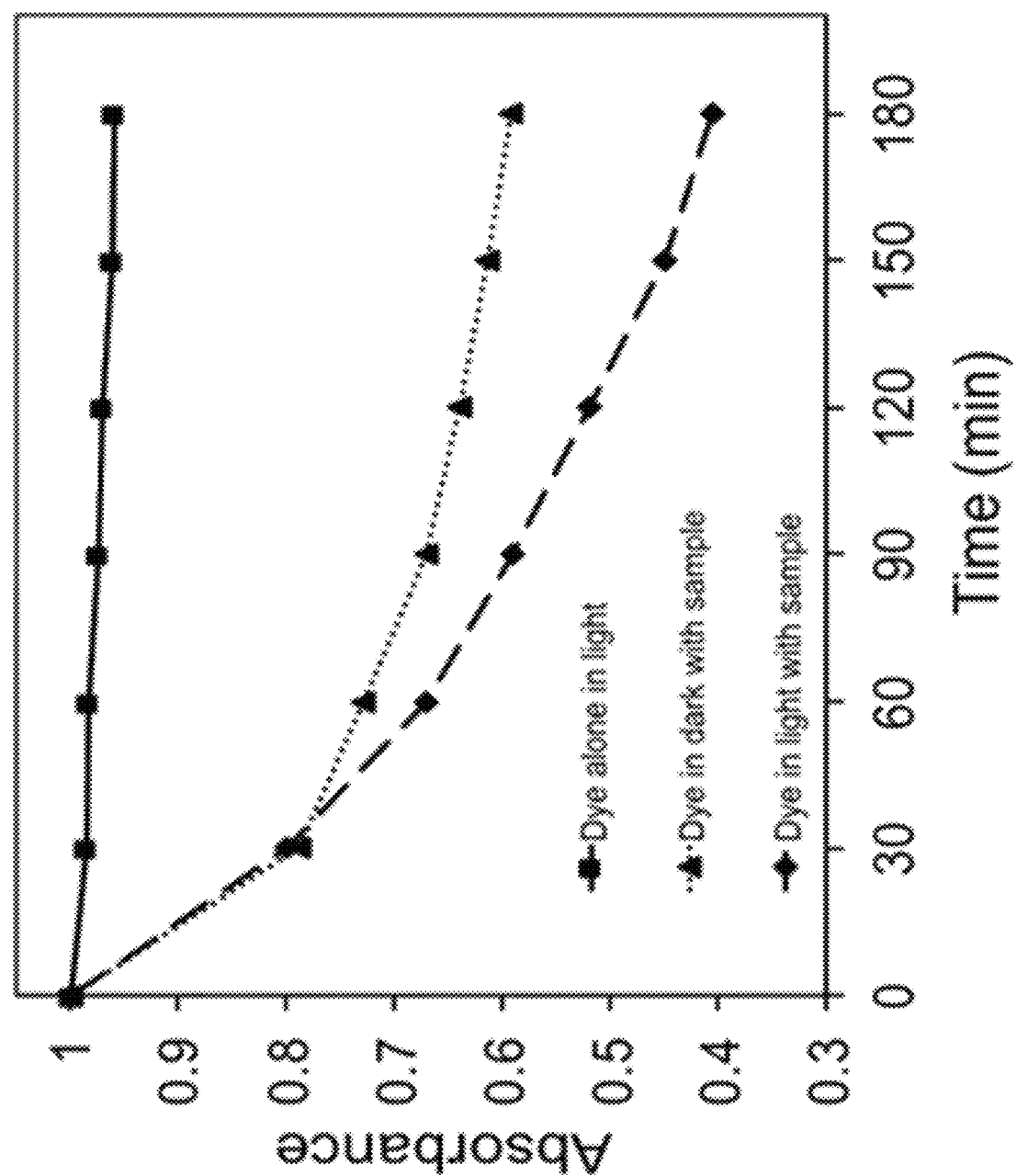
FIG. 3 shows photocatalytic degradation of Alcian blue 8GX dye using an N-doped photocatalyst carbonaceous material according to one embodiment of the present invention. When the dye alone was subjected to visible light, no degradation was observed. When the same dye was treated with a photocatalyst material, higher photocatalytic degradation in the presence of the visible light was observed than that without the visible light. This observation illustrates the doped carbonaceous material synthesized by doping and pyrolysis shows photocatalytic activity in the remediation of the dye.

FIG. 3 shows photocatalytic degradation of Alcian blue 8GX dye using an N-doped photocatalyst carbonaceous material according to one embodiment of the present invention. When the dye alone was subjected to visible light, no degradation was observed. When the same dye was treated with a photocatalyst material, higher photocatalytic degradation in the presence of the visible light was observed than that without the visible light. This observation illustrates the doped carbonaceous material synthesized by doping and pyrolysis shows photocatalytic activity in the remediation of the dye.

Figure 4:
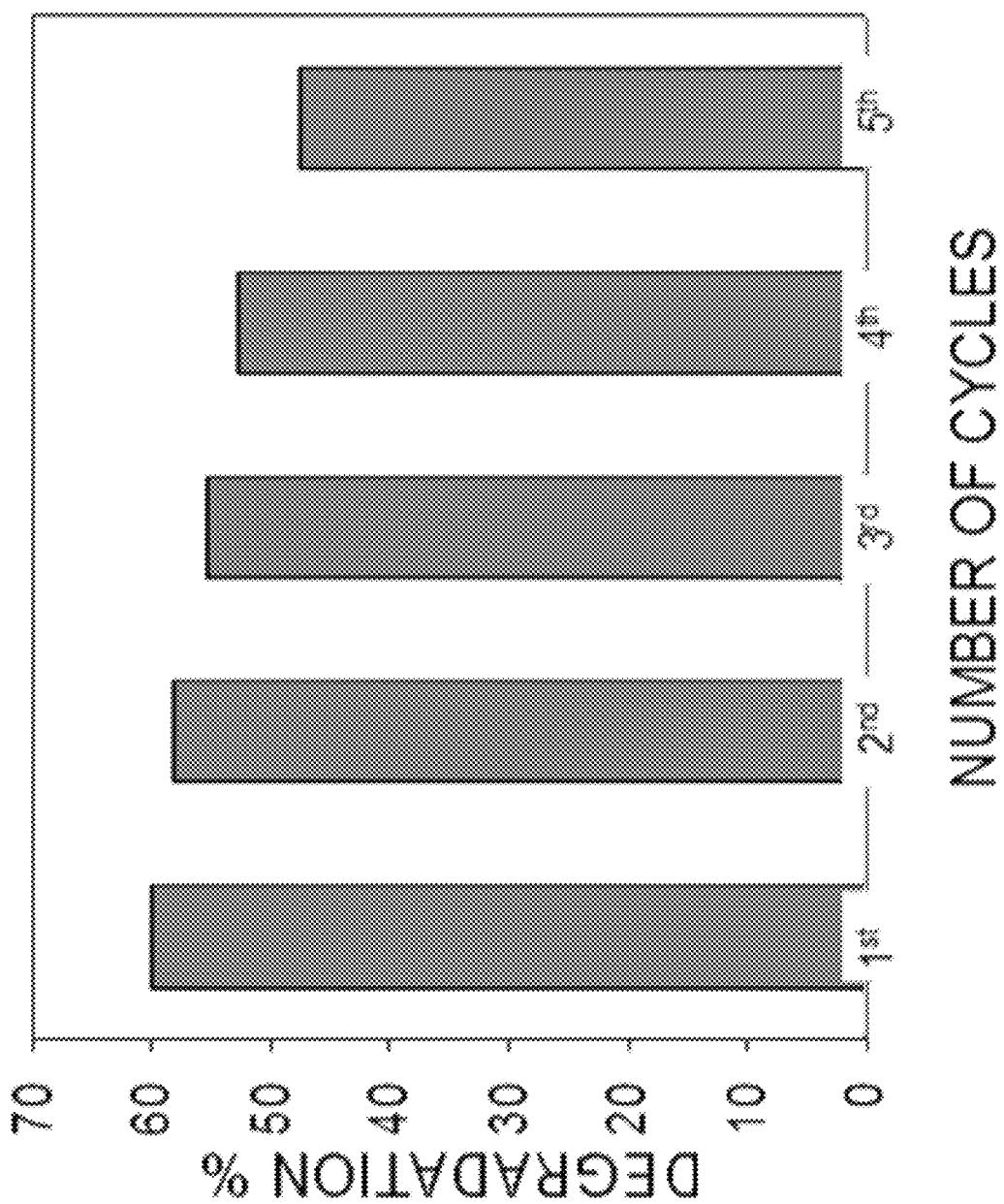
FIG. 4 shows that the N-doped carbonaceous materials used in the photocatalytic degradation of Alcian blue 8GX dye under visible light can be recycled for the multiple cycles, according to one embodiment of the present invention.

FIG. 4 shows that the N-doped carbonaceous materials used in the photocatalytic degradation of Alcian blue 8GX dye under the visible light can be recycled for the multiple cycles, according to one embodiment of the present invention.

Figure 5:
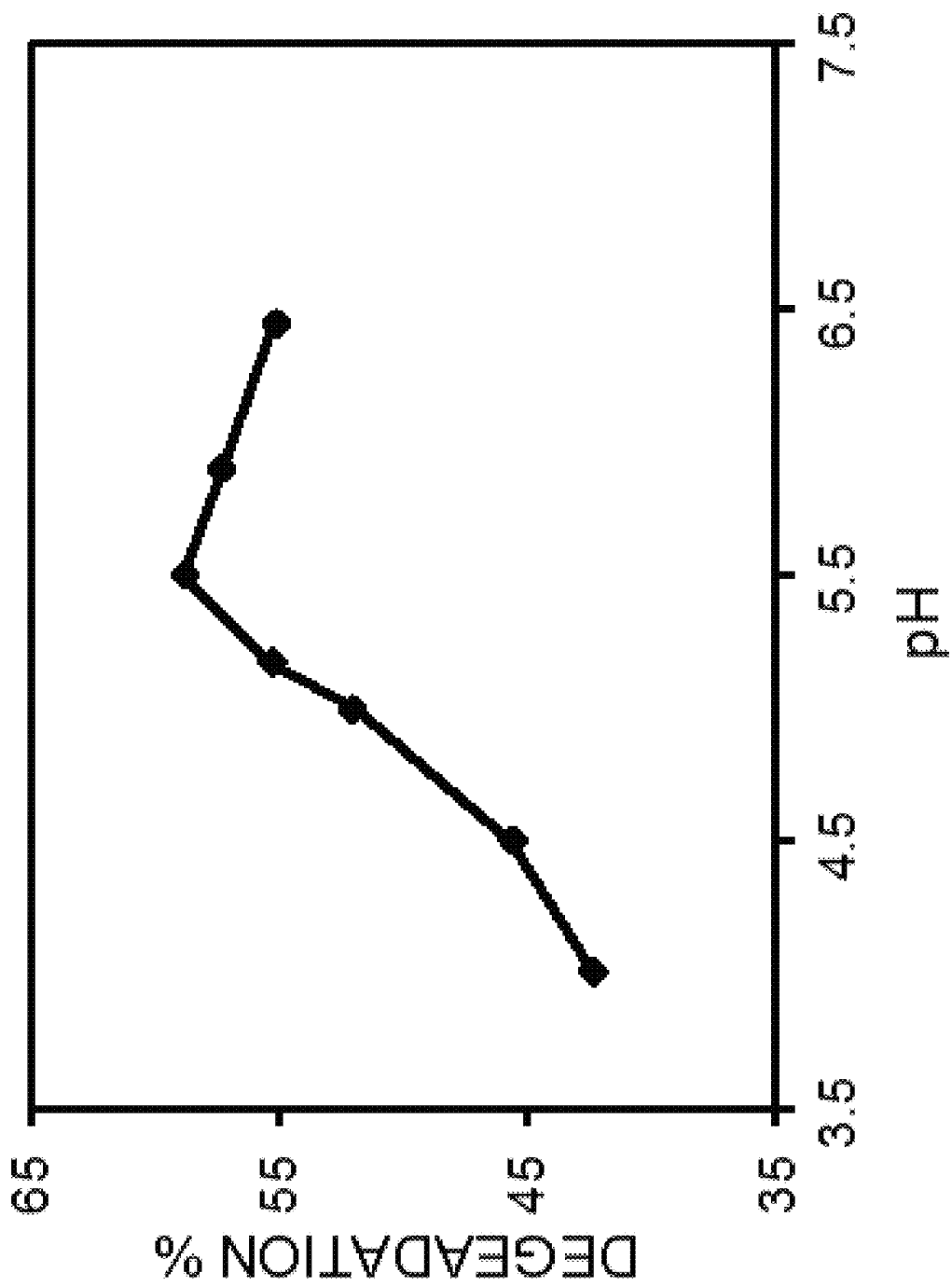
FIG. 5 shows the influence of pH on the photocatalytic degradation of dye by the N-doped carbonaceous material, according to one embodiment of the present invention.

FIG. 5 shows the influence of pH on the photocatalytic degradation of dye by the N-doped carbonaceous material, according to one embodiment of the present invention.

As listed in Table 1, the degradation efficiency of N-doped carbonaceous materials in the photocatalytic treatments of several textiles dyes under visible light is shown.

TABLE 1 degradation efficiency of N-doped carbonaceous materials in the photocatalytic treatments of several textiles dyes under visible light

| S.N. | Dyes | Degradation (%) |
|---|---|---|
| 1 | Indigo carmine | 98 |
| 2 | Methylene blue | 95 |
| 3 | Eosin yellowish | 90 |
| 4 | Methyl orange | 81 |
| 5 | Orange IV | 69 |
| 6 | Naphthol green B | 18 |

In one aspect, the invention relates to the synthesis of various doped carbonaceous materials that show photocatalytic activities under visible light illumination. In the first step of obtaining the photocatalyst doped carbonaceous material, the homogeneous/heterogeneous mixing of the starting precursor compounds either in their solid form or in a solution form by various chemical reactions are carried. The homogeneous/heterogeneous mixture after complete drying is pyrolyzed.

In certain embodiments, the pyrolysis is carried out in a tube furnace, which is a special reactor vessel design for high temperature heating (maximum about 1100° C.) of samples. It includes a horizontal quart tube, a precision programmable temperature controller device, and a pressure gauge connected to one end of the horizontal quart tube. During pyrolysis, the mixture is subjected to various temperatures for several hours, e.g., 1 hrs, 2 hrs, 3 hrs, 4 hrs, or 7 hrs, depending on the types of a dopant and a carbon source. After cooling, the doped carbonaceous material is obtained as a black composite material. No additional purification or activation of the composite material is required.

The flow rate of $N_2$ or Ar gas inside the tube furnace and the heating rate are controlled during the pyrolysis. These are increased or decreased depending upon the experimental conditions.

In certain embodiment, the pyrolysis is performed in in two steps. The first pyrolysis is carried out between the temperatures about 180 to about 200° C. holding this temperature for less than about 1 hr. This helps to remove the moisture present in the mixture without decomposing the compounds. The second pyrolysis is carried out in a temperature between greater than about 300° C. to about 1100° C. In one example of synthesis of N-doped carbonaceous material, pyrolysis of the mixture was performed at about 900° C. for about 2 hrs under a continuous flow of $N_2$ gas (heating rate 5° C./min). After cooling, an N-doped carbonaceous material was obtained in the black powder form.

The doped carbonaceous materials obtained by the pyrolysis method can be stored at high temperature and remain functional for the long-term purpose. As synthesized doped carbonaceous material, can be a photocatalyst and used for the photocatalytic reactions. One such application of this material in the photocatalytic reaction is the photocatalytic removal of pollutants from water or wastewater.

In certain embodiments, active photocatalyst can be heteroatom (e.g., N, B, S, P, F, etc.) doped carbonaceous materials, or semiconductors metal oxide (e.g., ZnO, $TiO_2$, NiO, $Ni_2O_3$, CuO, $Cu_2O$, $Co_2O_3$, $W_2O_3$, $WO_3$, $V_2O_5$, $Fe_3O_4$, FeO, $FeO_2$, $Fe_2O_3$, $RuO_2$, $RuO_4$, $Re_2O_7$, $MoO_3$, $ZrO_2$, $Cr_2O_3$, CrO, $CrO_2$, $SnO_2$, $CeO_2$ etc.) or metal sulfides (e.g., $FeS_2$, CdS, NiS, $NiS_2$, $Ni_3S_2$, $Ni_3S_4$, CoS, $Bi_2S_3$, ZnS, CuS, $Cu_2S$, PbS, $MoS_2$, $WS_2$, etc.) doped carbonaceous materials. It is also possible to use different metals precursor salts or a mixture of different metals salts with the semiconductor photocatalyst discussed above, as a dopant in developing the high active photocatalyst materials. It is also possible to use co-catalyst such as bio-mimetic catalyst (e.g., the metal catalysts comprise of metal salens, and any metal complexes of cyclic and acyclic tetraaza or triaza ligands (e.g. metal porphyrins, metal corroles, metal triazacyclononane, metal phthalocyanines and/or metal-amidomacrocyclic ligand) or metal oxides.

The use of co-catalysts can help to generate more reactive oxygen species (ROS) on the surface of photocatalyst doped carbonaceous material and enhance its photocatalytic activity toward the degradation of pollutants or micropollutants.

The visible light source of different wavelengths (generally of a range between about 400-700 nm) that are suitable for the target pollutants or micropollutants can be used to achieve maximum degradation in a short time.

Doped carbonaceous materials synthesized using natural or synthetic renewable polymers have several industrial applications. The use of environmentally friendly renewable polymers of synthetic and natural origin as raw materials will prove to be a low-cost and very good source of carbon to produce doped carbonaceous materials. This material can be scale up to produce doped carbonaceous materials in a nanoscale level that have very high porosity and greater surface area. This will help to meet the rapid increasing demand for low cost and high added value materials for different industrial applications such as photocatalysis, electrochemistry as supercapacitors and fuel cells, removals of pollutants from liquid and gaseous phase, $CO_2$ capture, etc.

The present invention relies on renewable natural or synthetic polymers that are abundant as a source of carbon for generating doped carbonaceous materials. Thus, it reduces the dependence on other sources of carbon that are expensive and non-renewable in origin. The regeneration problem faced by the various doped carbonaceous materials and the use of hazardous UV light source for photocatalytic treatment of pollutants in the conventional technology could be overcome by the present technology describe herein. It also reduces the high operating cost, lack of operating at high temperature, additional cost of buying chemicals, limited production of photocatalyst material of high quality and long-term durability etc. The present technology is environmentally sustainable.

These and other aspects of the present invention are further described below.

In one aspect of the invention, a method of synthesizing a doped carbonaceous material, includes mixing or reacting a carbon precursor material with at least one dopant to form a homogeneous/heterogeneous mixture; and subjecting the mixture to pyrolysis in an inert atmosphere to obtain the doped carbonaceous material.

In one embodiment, the pyrolysis is performed with a first pyrolysis carried out at a first temperature for a first period of time, and a second pyrolysis carried out at a second temperature for a second period of time. In one embodiment, the first temperature is in a range of about 180° C. to about 300° C., the second temperature is in a range of higher than about 300° C. to about 1100° C., the first period of time is less than about 1 hour, and the second period of time is about 1-2 hours. The temperature and time can be varied based on the types of the doped carbonaceous materials In one embodiment, the pyrolysis is performed in a tube furnace equipped with a precision programmable temperature controller device and an inert atmosphere inside the furnace created by passing inert gas.

In one embodiment, the carbon precursor material and the at least one dopant are mixed in a solid phase, or in a solution phase. In one embodiment, in solution phase, the mixture is obtained by reacting the mixture of starting compounds chemically through various chemical reaction process, followed by solvent evaporation and drying before subjecting the mixture to the pyrolysis.

In one embodiment, the carbon precursor material comprises a renewable synthetic or natural polymer. In one embodiment, the renewable natural polymer comprises chitosan, chitin, cellulose, guar, alginic acid, hemicellulose, dextran, xanthan, agar, lignin, starch, maltose, sucrose, dextrose, silk, wool, DNA, RNA, protein, glycogen, amylose, enzymes, polypeptides, pectin, keratin, collagen, hyaluronic acid or their derivatives and the renewable synthetic polymer comprises polylactic acid, polyglycolic acid, polycaprolactone, polyaspartic acid, polyphosphazenes polyhydroxyalkanoate, polybutyrate, poly-3-hydroxybutyrate, poly (lactide-co-glycolide), poly(hydroxybutyrate-co-hydroxyvalerate), poly(butylene succinate), poly (butylene succinate adipate), poly(ethylene succinate), or their derivatives or a combination of them.

In one embodiment, the at least one dopant comprises heteroatoms containing molecules, metal oxides/sulfides, metal catalysts, metal complexes, metal salts, or a combination of them. In one embodiment, the heteroatoms containing molecules comprise any N-containing precursor (e.g., urea, pyrrole, ammonia, cyanide, N-heterocyclic compounds (e.g. pyridine, pyrazine, imidazole), ethylenediamine, diethylenetriamine, triethylenetetramine, bipyridine, phenanthrolene, polypyrrole, polyaniline, polyimide, dopamine, melamine, amines (1°, 2°, 3° organic amines), amino acids, 2,2';6',2"-terpyridine, dimethylglyoximate, 1,4,7,10-tetraazacyclododecane-1,4,7,10-tetraacetic acid, diethylentriaminepentaacetic acid, iminodiacetic acid, nitrilotriacetic acid, inorganic and organic quaternary ammonium salts, chitosan, etc.), P-containing precursor (e.g., phosphoric acid, alkyl and aryl phosphines, phytic acid etc.), S-containing precursor (thiophene, p-toluenesulfonic acid, benzyl disulfide, potassium sulfate, sodium thiosulfate, ferrous sulfate etc.), B-containing precursor (e.g., boric acid, sodium tetraphenylborate etc.), F-containing precursor (e.g., polytetrafluoroethylene, ammonium fluoride etc.), both S- and N-containing precursor (e.g., diammonium hydrogen phosphate, thiourea, cysteine, glutathione etc.), both F- and P-containing precursor (e.g., sodium hexafluoro phosphate), tri F- P- and N-containing precursor (e.g., ammonium hexafluorophosphate) and the like.

For example, the synthesis of N—ZnO-doped carbonaceous material can be done by mixing urea and ZnO or its salts together with cellulose either in a solid state or in a solution state.

In one embodiment, the metal oxides/sulfides comprise $ZnO$, $TiO_2$, $NiO$, $Ni_2O_3$, $CuO$, $Cu_2O$, $Co_2O_3$, $W_2O_3$, $WO_3$, $V_2O_5$, $Fe_3O_4$, $FeO$, $FeO_2$, $Fe_2O_3$, $RuO_2$, $RuO_4$, $Re_2O_7$, $MoO_3$, $ZrO_2$, $Cr_2O_3$, $CrO$, $CrO_2$, $SnO_2$, $CeO_2$, $FeS_2$, $CdS$, $NiS$, $NiS_2$, $Ni_3S_2$, $Ni_3S_4$, $CoS$, $Bi_2S_3$, $ZnS$, $CuS$, $Cu_2S$, $PbS$, $MoS_2$, $WS_2$, etc. or the like.

In one embodiment, the metal catalysts comprise of metal salens, and any metal complexes of cyclic and acyclic tetraaza or triaza ligands (e.g. metal porphyrins, metal corroles, metal triazacyclononane, metal phthalocyanines and/or metal-amidomacrocyclic ligand In another aspect, the invention relates to a doped carbonaceous material synthesized as above.

In one embodiment, activities of the doped carbonaceous material are tunable by varying the carbon precursor material and the at least one dopant in a mass ratio (w %) or in an atomic weight percentage (at. %).

In a further aspect of the invention, a method of purifying water includes providing an amount of the doped carbonaceous material synthesized above in the water as a photocatalyst; and illuminating the water containing the doped carbonaceous material with visible light such that under visible light illumination, the doped carbonaceous material generates excitons (electron-hole pairs) and has high electron affinity, which react with oxygen and water adsorbed on its surface forming reactive oxygen species (ROS), such as hydroxyl radicals and superoxide radicals singlet oxygen, hydrogen peroxide, that, in turn, decompose pollutants and micropollutants.

In one embodiment, the doped carbonaceous material is re-usable.

Figure 6:
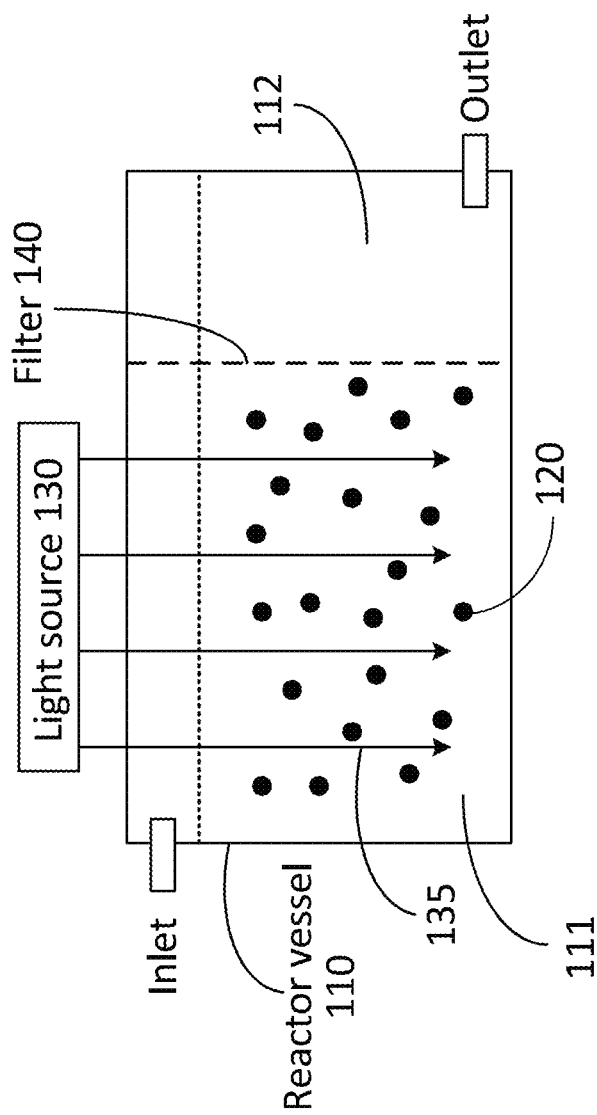
FIG. 6 shows schematically a system of purifying water according to one embodiment of the present invention.

In a further aspect, the invention relates to a system of purifying water. In one embodiment as shown in FIG. 6, the system has a reactor vessel 110 containing the water and the doped carbonaceous material 120 that is dispersed in the water. The reactor vessel 110 may have a first portion 111 and a second portion 112 that may be separated by a filter 140, such that the first portion 111 contains the water to be purified and the doped carbonaceous material 120, and the second portion 112 contains the purified water. The reactor vessel 110 may include an inlet for inputting the water to be purified into the first portion 111, and an outlet for outputting the purified water.

The system also has a light source 130 that operably generate visible light 135 to illuminate the water containing the doped carbonaceous material 120 in the first portion 111 of the reactor vessel 110. As such, under photocatalytic reactions of the doped carbonaceous material 120 with the visible light 135, pollutants in the water are adsorbed on active surface sites of the doped carbonaceous material 120, as shown in FIG. 1, which are removable from the water.

In one embodiment, the system further has a stirrer to disperse the doped carbonaceous material in the water.

In one embodiment, the light source comprises light emitting diodes (LEDs), an incandescent lamp, mercury vapor lamp, xenon (Xe) lamp, or natural sunlight.

In one embodiment, the photocatalytic reaction is optimized to achieve maximal photocatalytic degradation of adsorbed pollutants, by an amount of the doped carbonaceous material, a pH condition, a concentration of pollutants, and a wavelength of the visible light.

In one embodiment, the doped carbonaceous material is re-usable.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. A method of synthesizing a doped carbonaceous material, comprising:
   mixing or functionalizing a carbon precursor material with at least one dopant to form a homogeneous/heterogeneous mixture; and
   subjecting the mixture to pyrolysis in an inert atmosphere to obtain the doped carbonaceous material,
   wherein the at least one dopant comprises metal oxides/sulfides, wherein the metal oxides/sulfides comprise $NiO$, $Ni_2O_3$, $CuO$, $Cu_2O$, $Co_2O_3$, $W_2O_3$, $WO_3$, $V_2O_5$, $FeO$, $FeO_2$, $Fe_2O_3$, $RuO_2$, $RuO_4$, $Re_2O_7$, $MoO_3$, $ZrO_2$, $Cr_2O_3$, $CrO$, $CrO_2$, $CeO_2$, $FeS_2$, $CdS$, $NiS$, $NiS_2$, $Ni_3S_2$, $Ni_3S_4$, $CoS$, $Bi_2S_3$, $ZnS$, $CuS$, $Cu_2S$, $PbS$, $MoS_2$, $WS_2$, or a combination of them.

2. The method of claim 1, wherein the pyrolysis is performed with a first pyrolysis carried out at a first temperature for a first period of time, and a second pyrolysis carried out at a second temperature for a second period of time.

3. The method of claim 2, wherein the first temperature is in a range of about 180° C. to about 300° C., the second temperature is in a range of higher than about 300° C. to about 1100° C., the first period of time is less than about 1 hour, and the second period of time is about 1-2 hours, wherein the first and second temperatures and the first and second periods of time are variable based on a type of the doped carbonaceous material.

4. The method of claim 1, wherein the pyrolysis is performed in a tube furnace equipped with a precision programmable temperature controller device and an inert atmosphere inside the furnace created by passing inert gases such as $N_2$ or Ar.

5. The method of claim 1, wherein the carbon precursor material comprises a renewable natural and synthetic polymer.

6. The method of claim 5, wherein the renewable natural polymer comprises chitosan, chitin, cellulose, guar, alginic acid, hemicellulose, dextran, xanthan, agar, lignin, starch, maltose, sucrose, dextrose, silk, wool, DNA, RNA, protein, glycogen, amylose, enzymes, polypeptides, pectin, keratin, collagen, hyaluronic acid or their derivatives or combination of them, and the renewable synthetic polymer comprises polylactic acid, polyglycolic acid, polycaprolactone, polyaspartic acid, polyphosphazenes polyhydroxyalkanoate, polybutyrate, poly-3-hydroxybutyrate, poly (lactide-co-glycolide), poly(hydroxybutyrate-co-hydroxyvalerate), poly (butylene succinate), poly (butylene succinate adipate), poly (ethylene succinate), or their derivatives or a combination of them.

7. The method of claim 1, wherein the at least one dopant further comprises heteroatoms containing molecules, metal catalysts, metal complexes, metal salts, or a combination of them.

8. The method of claim 7, wherein the heteroatoms containing molecules comprise at least one of N-containing precursor, P-containing precursor, S-containing precursor, B-containing precursor, F-containing precursor, dual S- and N-containing precursor, dual F- and P-containing precursor, and tri F- P- and N-containing precursor.

9. The method of claim 8,
   wherein the N-containing precursor comprises urea, pyrrole, ammonia, cyanide, N-heterocyclic compounds including pyridine, pyrazine, and/or imidazole, ethylenediamine, diethylenetriamine, triethylenetetramine, bipyridine, phenanthrolene, polypyrrole, polyaniline, polyimide, dopamine, melamine, amines, amino acids, 2,2';6',2''-terpyridine, dimethylglyoximate, 1,4,7,10-tetraazacyclododecane-1,4,7,10-tetraacetic acid, diethylenetriaminepentaacetic acid, iminodiacetic acid, nitrilotriacetic acid, inorganic and organic quaternary ammonium salts, chitosan, or a combination of them;
   wherein the P-containing precursor comprises phosphoric acid, alkyl and aryl phosphines, phytic acid, or a combination of them;
   wherein the S-containing precursor comprises thiophene, p-toluenesulfonic acid, benzyl disulfide, potassium sulfate, sodium thiosulfate, ferrous sulfate, or a combination of them;
   wherein the B-containing precursor comprises boric acid, sodium tetraphenylborate, or a combination of them;
   wherein the F-containing precursor comprises polytetrafluoroethylene, ammonium fluoride, or a combination of them;
   wherein the dual S- and N-containing precursor comprises diammonium hydrogen phosphate, thiourea, cysteine, glutathione, or a combination of them;
   wherein the dual F- and P-containing precursor comprises sodium hexafluoro phosphate; and
   wherein the tri F-, P- and N-containing precursor comprises ammonium hexafluorophosphate.

10. The method of claim 7, wherein the metal catalysts comprise of metal salens, and any metal complexes of cyclic and acyclic tetraaza or triaza ligands including metal porphyrins, metal corroles, metal triazacyclononane, metal phthalocyanines and/or metal-amidomacrocyclic ligand.

11. The method of claim 1, wherein the carbon precursor material and the at least one dopant are mixed in a solid phase, or in a solution phase.

12. The method of claim 11, wherein, in solution phase, the mixture is obtained by reacting the mixture of starting compounds chemically through chemical reaction process, followed by solvent evaporation and drying before subjecting the mixture to the pyrolysis.

13. A method of synthesizing a doped carbonaceous material, comprising:
    mixing or functionalizing a carbon precursor material with at least one dopant to form a homogeneous/heterogeneous mixture; and
    subjecting the mixture to pyrolysis in an inert atmosphere to obtain the doped carbonaceous material,
    wherein the at least one dopant comprises metal catalysts, wherein the metal catalysts comprise metal salens, and metal complexes of cyclic and acyclic tetraaza or triaza ligands including metal porphyrins, metal corroles, metal triazacyclononane, metal phthalocyanines and/or metal-amidomacrocyclic ligand.

* * * * *